March 21, 1933.  C. D. LAKE  1,902,035
TRANSFER MECHANISM
Original Filed Dec. 16, 1925   9 Sheets-Sheet 1

FIG. I.

Inventor
Clair D. Lake
By
Cooper, Kerr & Dunham
Attorneys

March 21, 1933. C. D. LAKE 1,902,035

TRANSFER MECHANISM

Original Filed Dec. 16, 1925 9 Sheets-Sheet 2

Inventor
Clair D. Lake

By
Cooper, Kerr & Dunham Attorneys

March 21, 1933.   C. D. LAKE   1,902,035

TRANSFER MECHANISM

Original Filed Dec. 16, 1925   9 Sheets-Sheet 5

Clair D. Lake
Inventor

By Cooper, Kerr & Dunham
Attorneys

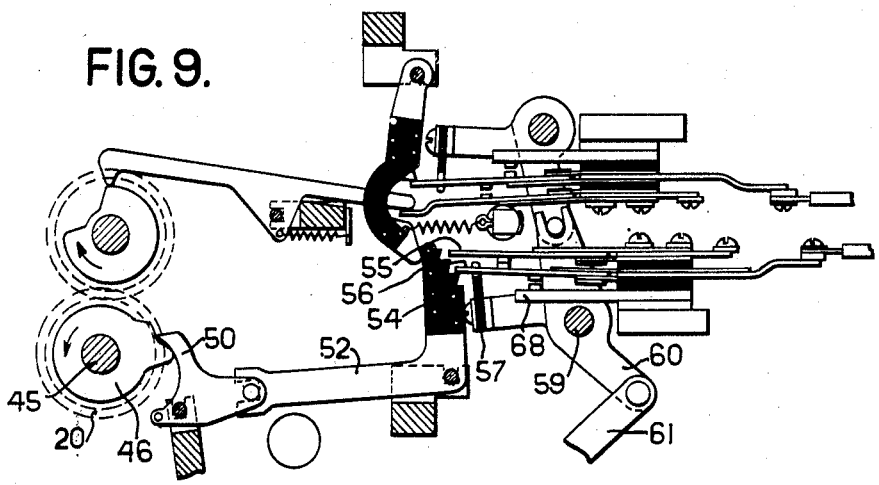
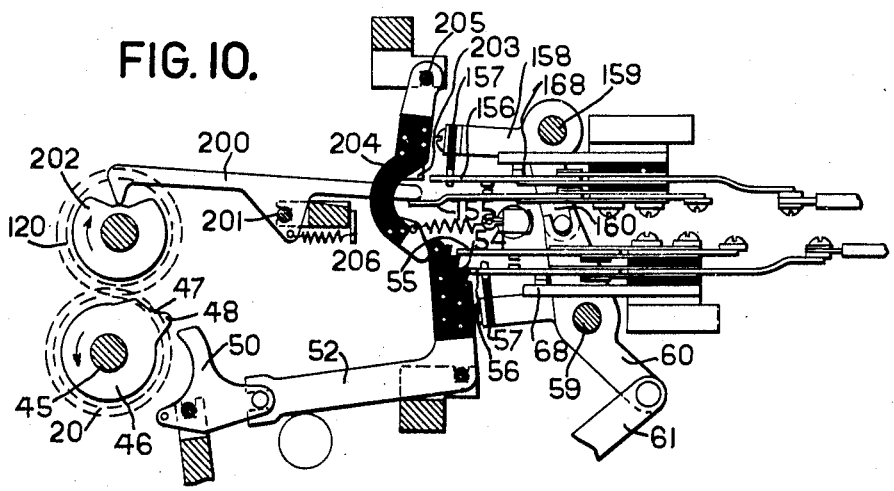

March 21, 1933.  C. D. LAKE  1,902,035
TRANSFER MECHANISM
Original Filed Dec. 16, 1925  9 Sheets—Sheet 8

Inventor
Clair D. Lake

By
Cooper, Kerr & Dunham Attorneys

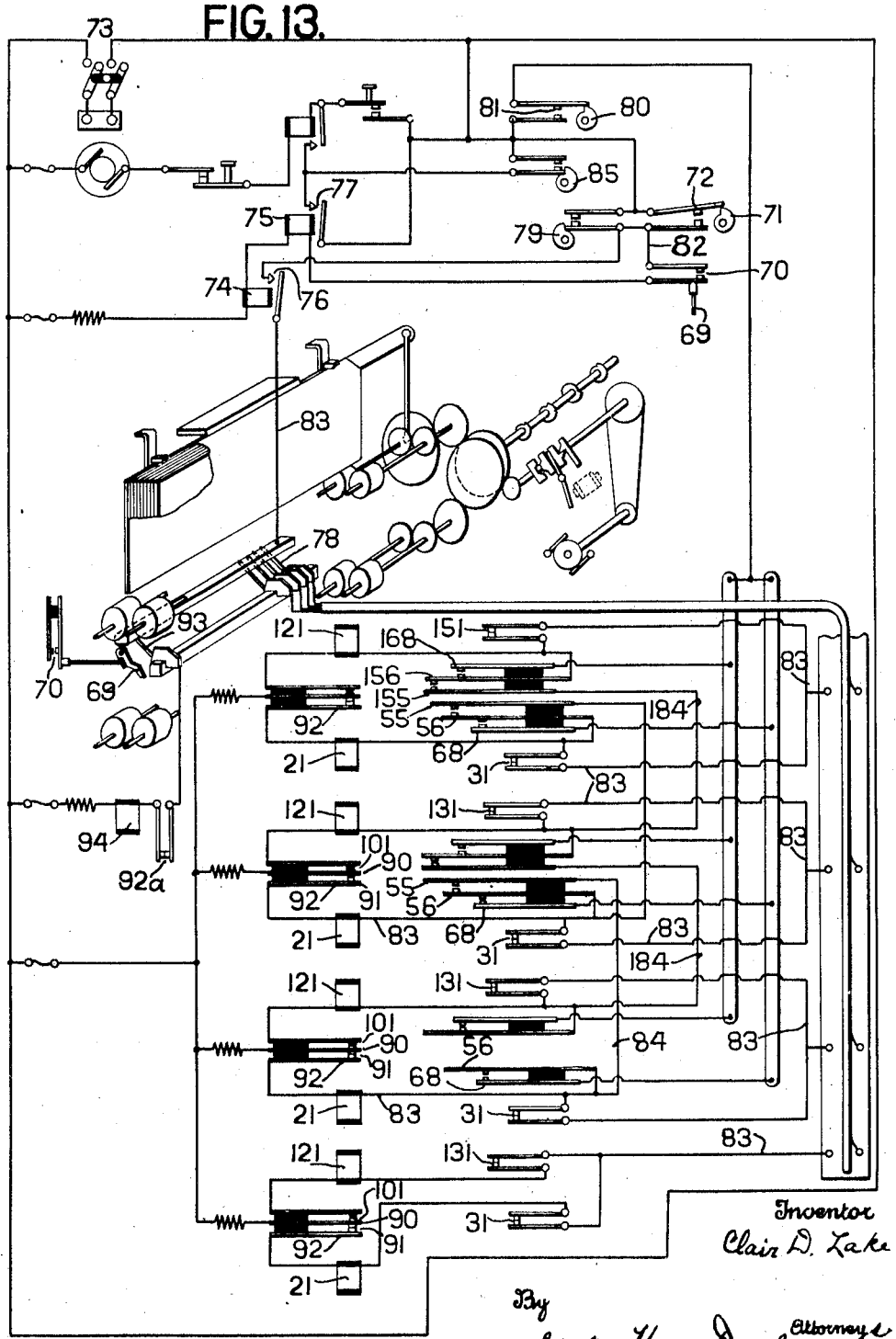

Patented Mar. 21, 1933

1,902,035

UNITED STATES PATENT OFFICE

CLAIR D. LAKE, OF BINGHAMTON, NEW YORK, ASSIGNOR TO THE TABULATING MACHINE COMPANY, OF ENDICOTT, NEW YORK, A CORPORATION OF NEW JERSEY

TRANSFER MECHANISM

Original application filed July 18, 1925, Serial No. 44,452. Divided and this application filed February 29, 1928. Serial No. 257,873.

This invention relates to improvements in transfer mechanism and has for its objects a provision of improvements in the electric transfer devices disclosed in my Patent No. 1,372,965.

Other objects of the present invention reside in the provision of transfer mechanism which is adapted for not only effecting additive transfer but also is adapted for effecting borrowing operations.

Further objects of the present invention reside in the provision of electric transfer devices so associated and arranged that the devices are capable of either transferring for adding operations or borrowing in subtracting operations.

Further objects of the present invention reside in the provision of novel transfer devices which are adapted for operation with an accumulator structure of novel type including a dual set of accumulators, such accumulators being so co-related as to show the balance in true numbers irrespective of the positive or negative characters of said balance.

Further objects of the present invention reside in the transfer device which is capable of being controlled for additive action or borrowing action under the control of a perforated record.

The present application constitutes a division of subject matter disclosed in my co-pending application Serial No. 44,452 filed July 18, 1925.

Other objects and advantages of the present invention will be hereinafter set forth in the accompanying specification and claims and shown in the drawings, which by way of illustration shows a preferred embodiment of my invention.

In the drawings:

Figs. 5, 6, 7, 8, 9 and 10 are detail views in the transfer mechanism in various operative positions.

Fig. 13 is a wiring diagram of the complete tabulating machine incorporating my improvements.

While the present invention relates particularly to transfer mechanism the operation of this transfer mechanism is in a certain way coordinated to the accumulator operation of the machine so that the accumulator organization will be first briefly described.

Figure 4:
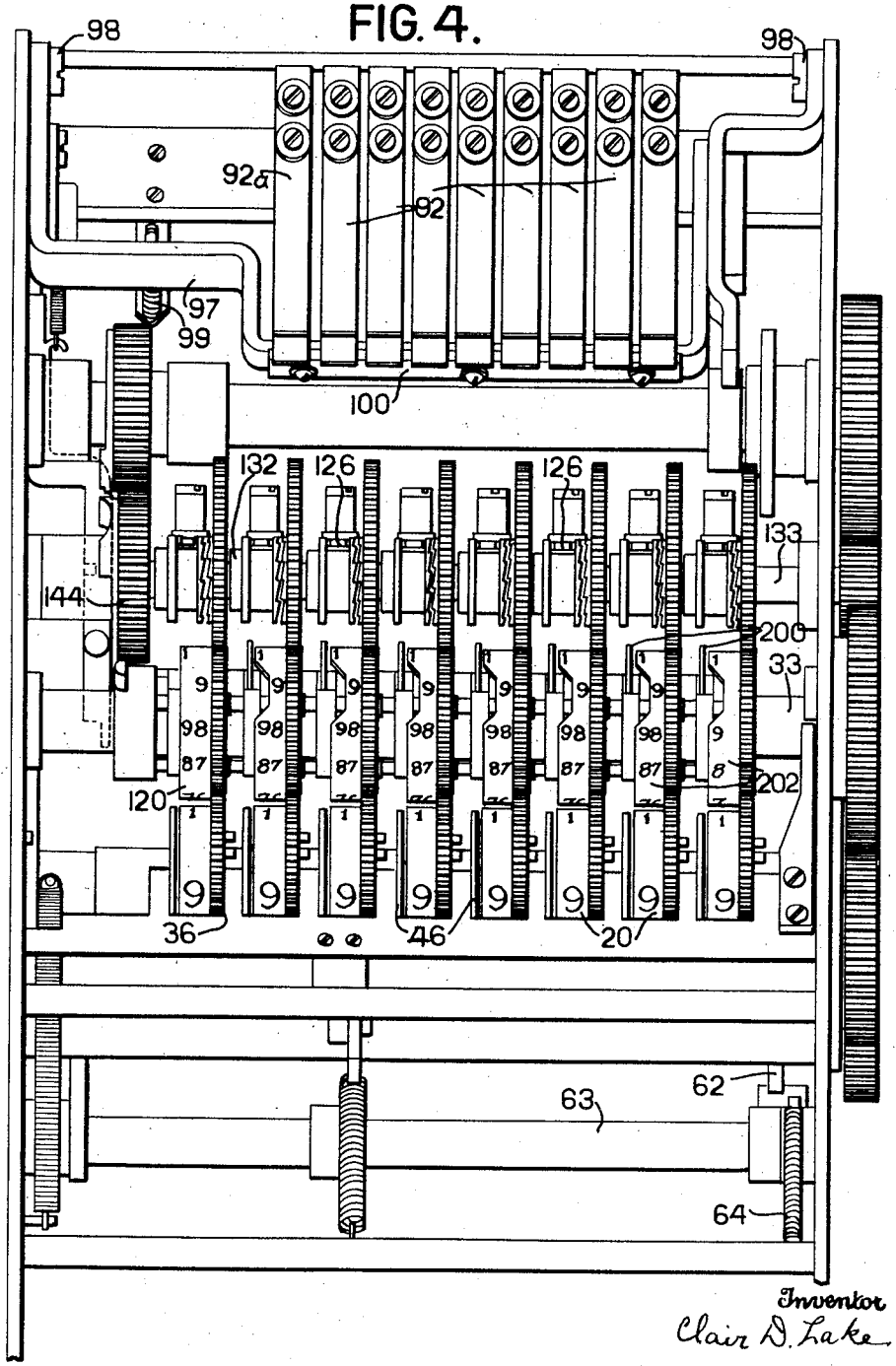
Fig. 4 is a front view of the upper and lower counters of the machine with certain shutter mechanisms removed.

Referring to Fig. 4 the accumulator is of dual type and comprises an upper set of wheels 120 and a lower set of wheels 20. As shown in this figure these upper and lower accumulator wheels are individually geared together.

Independent differential means are provided for entering the amounts from the record cards into the accumulators.

For effecting the entry of amounts into lower accumulators clutch magnets 21 are provided which through their usual armatures 25 actuate clutch shifting members 26 and engage clutches 32 (Fig. 3) which through the intermediate gears 35 and 36 turn the accumulator wheels to the proper differential extent.

The entry of amounts into the upper accumulators is effected under the control of clutch magnets 121 which through the usual armatures 125 actuate clutch shifting members 126 and in turn shift clutches 132, thereby turning the upper accumulator wheels 120 to a proper differential extent.

Part 34 constitutes the counterdrive shaft and from this shaft suitable gearing is provided for driving the clutch shafts 33 and 133.

Figure 3:
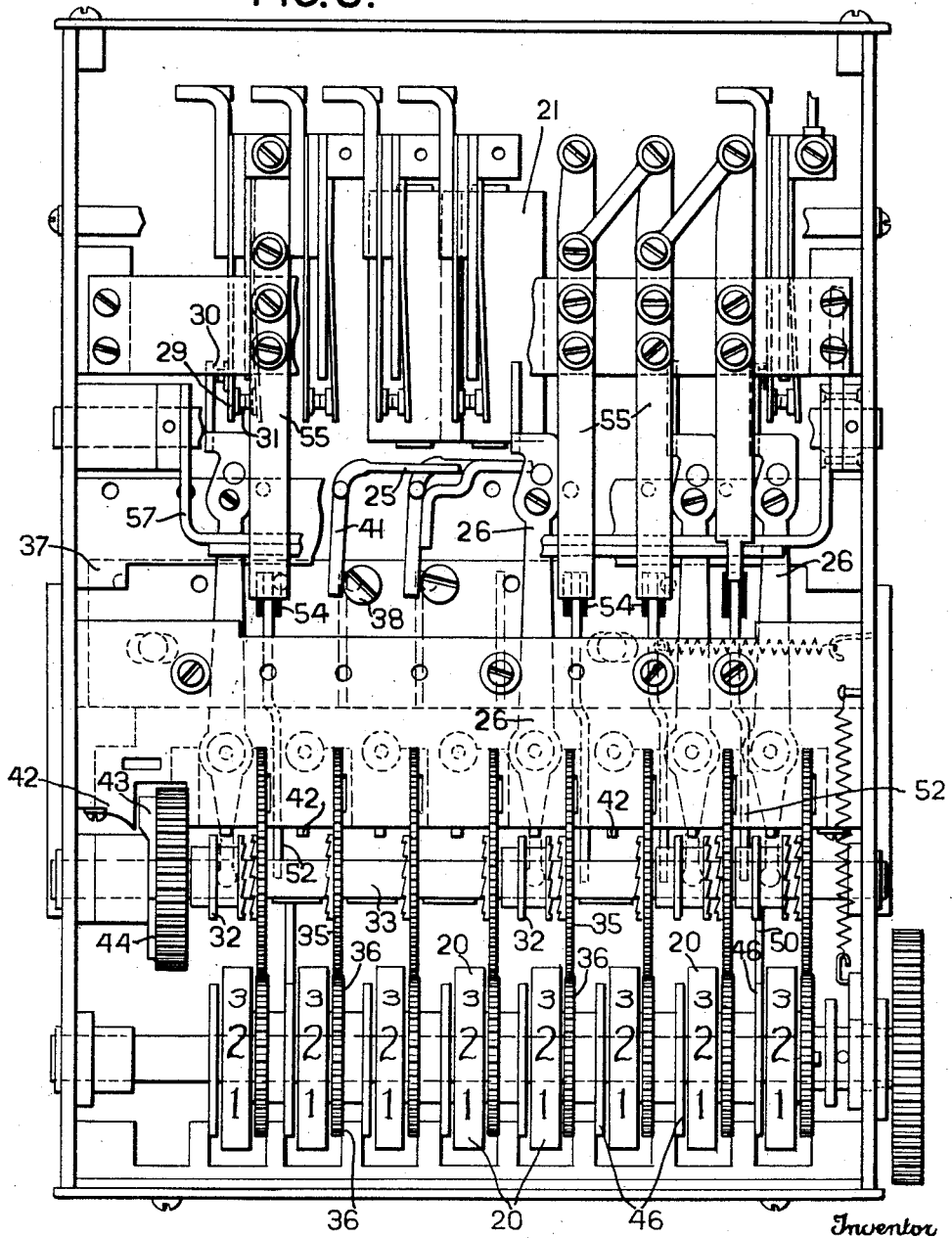
Fig. 3 is a plan of the lower section of the machine, sectional being taken on line 3—3 of Fig. 2.

The clutch shifting levers 26 when released are shifted by flat springs 29 which bear against projections 30 on said clutch shifting members (see Fig. 3). The springs 29 are insulated from the frame and constitute one member of a pair of contacts 31 in the circuit of the corresponding counter magnet 21, and when they are permitted to open, by the release of the members 26, the circuits are broken by the separation of contacts 31.

For relatching the clutch 32, restoring plate 37 is provided carrying adjustable stops 38. Plate 37 is reciprocated by a cam on one face of the gear mounted on shaft 34. The stops 38 act on members 41 during each revolution of shaft 34 at such time in the cycle operations when the lever members 26 are thrown back to release the clutches. Members 26 are restored by slide 42 operated by a cam 43 on one face of gear 44 on shaft 33. Each of the restoring cams above referred to has two steps, one of which returns the clutch levers to normal after the adding cycle and the other of which returns them to normal after the carry over.

The operation of adding into the lower accumulator wheels 20 will be readily understood. When the perforated record cards pass the sensing brushes, magnets 21 are selectively energized to enter the proper amount into the lower accumulator. It may be here stated that the lower accumulator is the one which directly receives the positive amount items from the record cards. The upper accumulator having wheels 120 is one which directly receives the negative amounts from the record cards. Due to the fact that the individual accumulator wheels 20 and 120 are individually geared together the turning of the wheels 20 results in a reverse turning of the wheels 120. Likewise the entering of an item into wheels 120 results in a corresponding reverse turning of the wheels 20.

The accumulator wheel sets taken together are adapted to show net balances and to show these net balances of positive and negative items whether the balance is positive or negative. In my co-pending application above referred to certain shutter mechanism is therein shown which is intended to properly disclose the balance from the upper or lower set of wheels, but this feature of the invention need not be here described as it forms the subject matter of said co-pending application.

The transfer mechanism will now be described.

Figure 6:
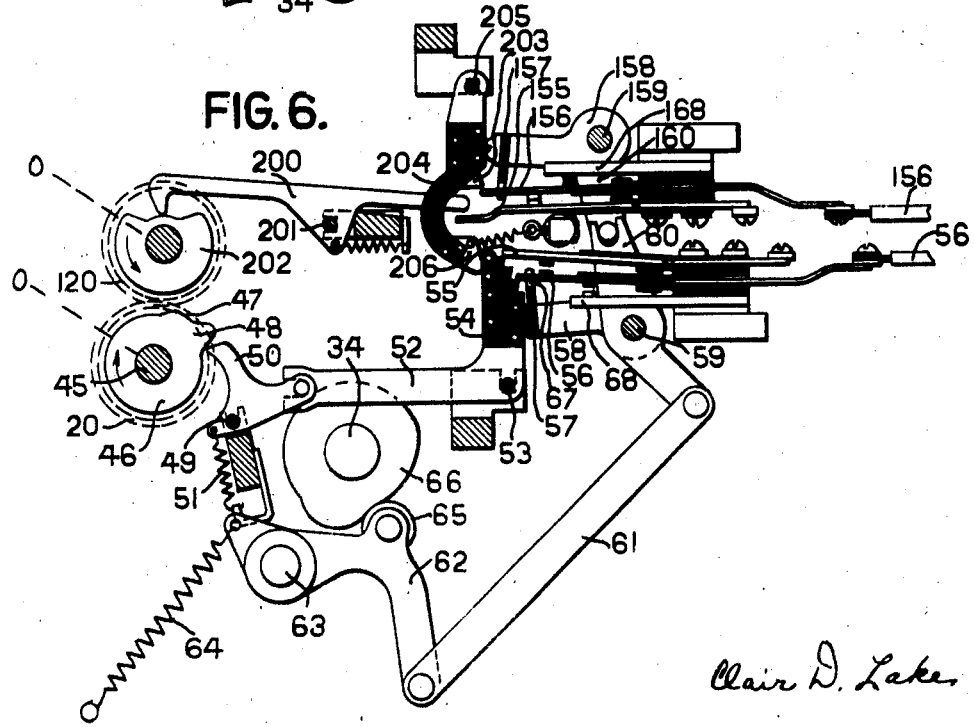

Referring to Fig. 6, each register wheel 20 has secured to it and alongside of it on its shaft 45, a cam 46 which has two raised parts or points of different height 47 and 48. Pivoted at 49 is a pawl 50 having a spring 51 connected therewith, which pawl travels on the periphery of its respective cam 46 and engages a bell-crank 52 pivoted at 53. Normally during the adding cycle of the machine or while the pawl travels over the lowermost part of the periphery of cam 46, the bell-crank 52 is not affected, but when the number 9 on a register wheel comes to the indicating line the lower of the two raised parts, or 47, comes under the end of the pawl depressing its right end with the result that the vertical part of bell-crank 52 is thrown a step to the left. When the register wheel is advanced another digit space the highest part of the cam, or 48, moves the plate further with the result that the vertical end of plate 52 is moved to the left another step.

The top edge of plate 52 contains a series of three steps 54. The steps are all completely insulated and normally upon the top or first and on the third step rests the ends of the two spring contacts 55 and 56 insulated from each other and suitably supported on the frame of the machine.

Beneath the entire row of contacts, it being understood that there is a bell-crank 52 and three contacts for each register wheel except for the first wheel which has only two contacts, there is a bail 57 of insulating material carried by arms 58 of a frame pivoted at 59. An upstanding arm 60 is provided for a purpose which will be hereafter explained. Arms 58 are rocked by link 61 connected to a bell-crank 62 pivoted at 63 and provided with a spring 64. This bell-crank lever at its knee carries a roller 65 which travels upon the periphery of cam 66, said cam being fastened to shaft 34. Cam 66 has portions of different height as shown, there being a concentric or normal portion, a raised portion above the normal and a depressed portion below the normal.

The bail bar 57 has notches in its upper edge as indicated at 67 and each contact 56 has a narrow end that fits into one of these notches while the upper contacts 55 are wider and span the notches.

During each revolution of the driven shaft 34 the concentric portion of the cam 66 retains the bail in its normal position during the adding portion of the cycle, after which the bail is lowered to effect the transfer or carry over, then the bail is raised above the normal to permit the stepped end plate 52 to return to its normal position allowing contacts 55 and 56 to latch or rest upon the steps 54 and finally the bail is lowered to normal position. During each revolution of a register wheel the stepped end of plate 52 is shifted from its normal to two other positions to the left. By its movement into the first of these other positions the top contact 55 is unlatched or released from the first step and by its second movement the lower contact 56 is unlatched or released from the third step. The operation of the mechanism may now be seen by reference to Figs. 7 to 10.

Normally the contacts 55 and 56 occupy the positions shown in Fig. 6, contact 55 resting close to the edge of the first step of plate 52, and contact 56 resting well on the third step. As the register wheel turns to bring the numeral 9 to the window, the lower of the two raised portions, or part 47 on cam 46 comes under pawl 50 and the plate 52 being shifted unlatches upper contacts 55 and permits it to drop onto bail 57 which is at this time in its normal position. The parts are then in the positions shown in Fig. 7 so long as bail 57 is not moved, as it will not be during the adding part of the cycle. If by the further movement of one step of the register wheel the character 0 is brought to the window, then the highest part of cam 46 shifts the plate 52 another step to the left and this unlatches or releases the lower contact from the third step, and both contacts 55 and 56 will thereupon rest upon the bail as shown in Fig. 8.

Figure 7:
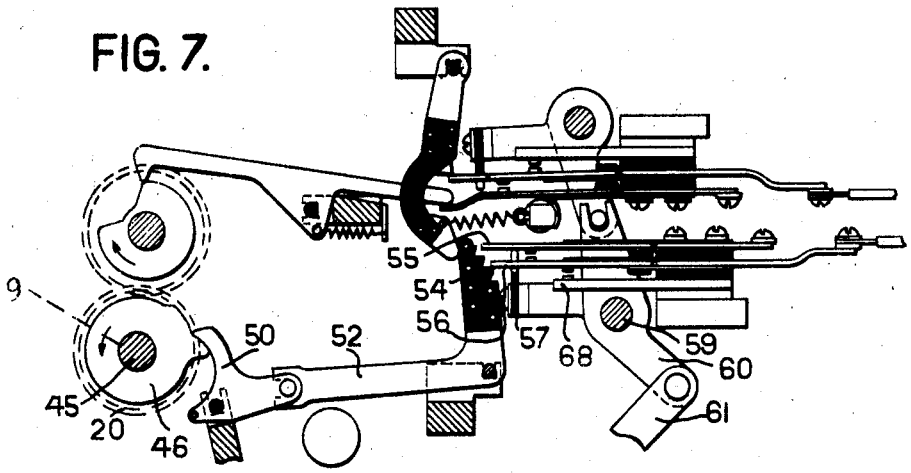
Figure 8:
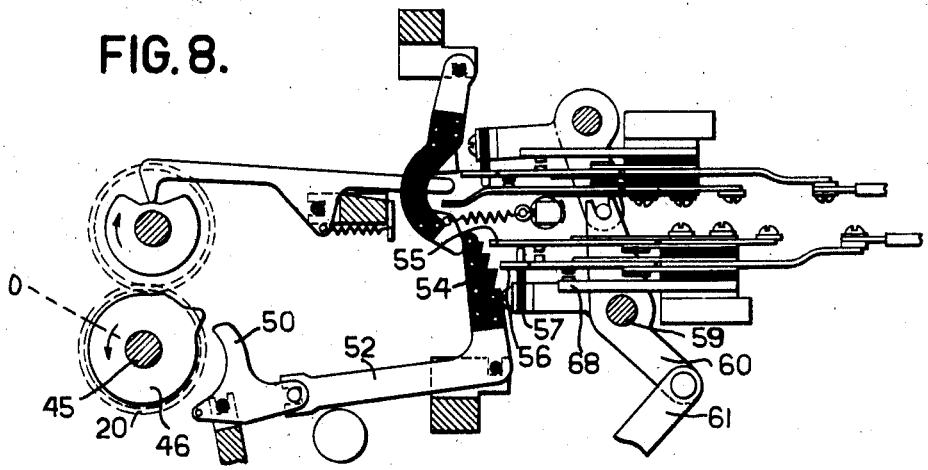

Figs. 7 and 8 illustrate the end of the adding portion of the cycle, the register wheel in Fig. 7 showing 9 and the register wheel in Fig. 8 showing 0. The parts illustrated are in the setup condition with contacts 55 and 56 separated. Fig. 9 illustrates the condition of parts of Fig. 7 after the adding cycle but with the bail lowered, but owing to the register wheel indicating 9 the contacts 55 and 56 only are closed to establish electrical connection with the register wheel of the next higher order. Current however, cannot flow through these contacts until plate 52 permits contacts 68 to close as shown in Fig. 10 to establish a circuit as hereinafter described. Fig. 10 shows the parts of Fig. 9 after the adding cycle with the bail lowered and with the register wheel moved from 9 to 0 position.

Referring now to Fig. 13, this diagram represents the tabulating machine and the circuits used in operating it, including the improvements constituting the present invention. The cards are fed through the machine in the usual manner as diagrammatically illustrated. As the cards are fed, card lever 69 is moved to maintain the closure of card lever contact 70. At this time cam 71, operated by the machine, closes contact 72, whereupon the circuit from the source 73 is closed, energizing a counter control relay 74 and motor control relay 75. This results in the closure of contact 76 and 77 respectively.

Assuming that the machine is operating and cards are being fed therethrough, whenever a brush 78 comes into contact with a perforation in the card a path for the current is established through such counter magnet as may be determined by the index point position of the perforation and the corresponding clutch is shifted into engagement and remains so shifted during the adding cycle. Between cards cam contact 79 operates to break the card circuit.

As is customary, the clutches are all restored or disengaged at the end of the adding cycle. The cycle of operations, however, is not complete and the remaining portion of the card cycle is utilized for effecting by electrical means such carrying or transferring from one register wheel to the next as the positions of such wheels and the conditions of adding may require.

There is provided a carry control cam 80 which at this time in the cycle, after the adding cycle, closes contacts 81 which supply current to a conductor 82 connected to all of the lowermost contacts 68 (Figs. 6 and 13) which lie under contacts 55 and 56. If at the moment no wheel is in position to expose a figure near the upper limit of 0 and there are no figures to be added requiring any carrying or shifting of any one step, then all contacts 55, 56 and 68 will be out of engagement and no path for the current is provided through contacts 68.

Figure 11:
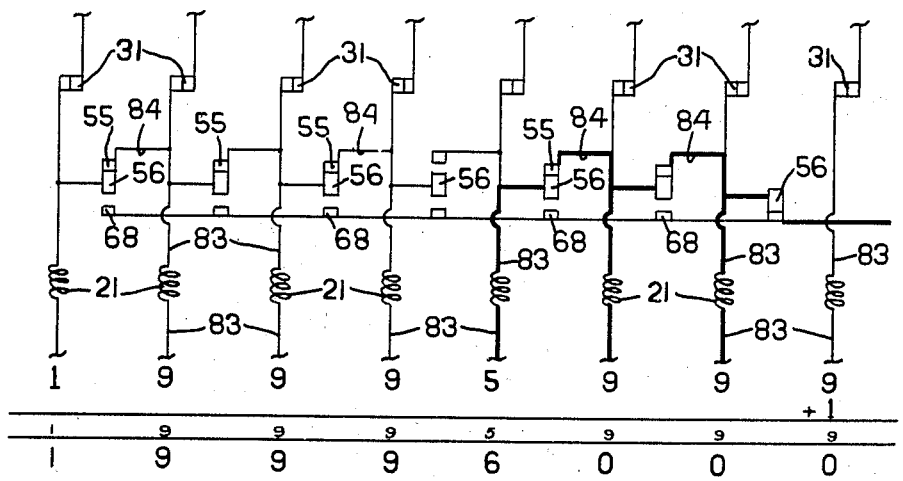
Fig. 11 is a diagram showing the position of contacts corresponding to a particular adding computation.

It may happen, on the other hand, that such conditions exist as are represented in Fig. 11, in other words, the exposed numerals on the accumulator may be 19,995,999, and the amount to be added is one unit. The counter magnet 21 at the right in Fig. 11 will therefore be energized during the adding portion of the cycle and will advance its register wheel one unit space. As there is no wheel of lower order than the units wheel, there is, of course, no carrying device up to the units wheel, but the units, tens, and hundreds wheels, and all others which display nines will have previously shifted their respective plates 52 to allow the respective contacts 55 and 56 (contact 56 only in the case of the units) to assume the positions shown in Fig. 7. The bail is then lowered to the position shown in Figs. 9 and 10, allowing contacts 56 and 68 to close in all cases involving transfer as is shown in Fig. 10 and allowing contacts 55 and 56 to close as shown in Fig. 9, except in the case of the units.

At this point the adding part of the cycle is complete as well as the setting up of the transfer controlling means.

The next phase takes place instantly at the time contacts 81 controlled by cam 80 (Fig. 13) are closed. The transferring is instantaneous as the circuit is established at once from the contacts 68 and 56 controlled by the units wheel to and through the counter magnets of the tens wheel by wire or other connections 83. The clutch lever 26 controlled by magnet 21 is released or unlatched setting the clutch ready to be brought into operation to revolve the tens wheel one step. But the contacts 55 and 56 controlled by the tens wheel which at that instant exhibits 9 will at that moment be in the position shown in Fig. 9 so that current will pass by wire 84 to contacts 55, 56 and thence by wire 83 of the hundreds wheel through the latter's counter magnet and the controlling means is released or set to advance the hundreds wheels one step.

The contacts controlled by the hundreds wheel, which is also assumed to show 9, control the means for advancing the thousands wheel one step the same as explained in the preceding paragraph. It will be observed that there are other wheels of the series at 9 in which case their parts will be in position shown in Fig. 7 and as the wheels of the next lower order of units are not moved to 0 position these wheels are not affected. This completes the second phase of the cycle. In Fig. 11 the controlling circuits for the tens, hundreds and thousands wheels during this second phase are shown by heavy lines.

The carrying operation now takes place and the same clutches which perform the adding operation engage and revolve simultaneously the tens, hundreds and thousands wheels one step. The current path is now broken by cam contacts 85. The clutches are then retracted and reset by the same means which effected such resetting after the adding operation.

At or near the end of the cycle or revolution of the driving shaft of the machine, the bail 57 is raised above the normal position by the high part of cam 66, whereby the two contacts 55 and 56 are raised by the bail sufficiently to permit lever 52 to swing back to the right and re-engage or re-latch said contacts on their first and third steps 54.

The foregoing explanation has assumed that the numbers are positive numbers and that they are entered into the lower accumulator 20. The operation for the entry of negative numbers will now be described.

Figure 1:
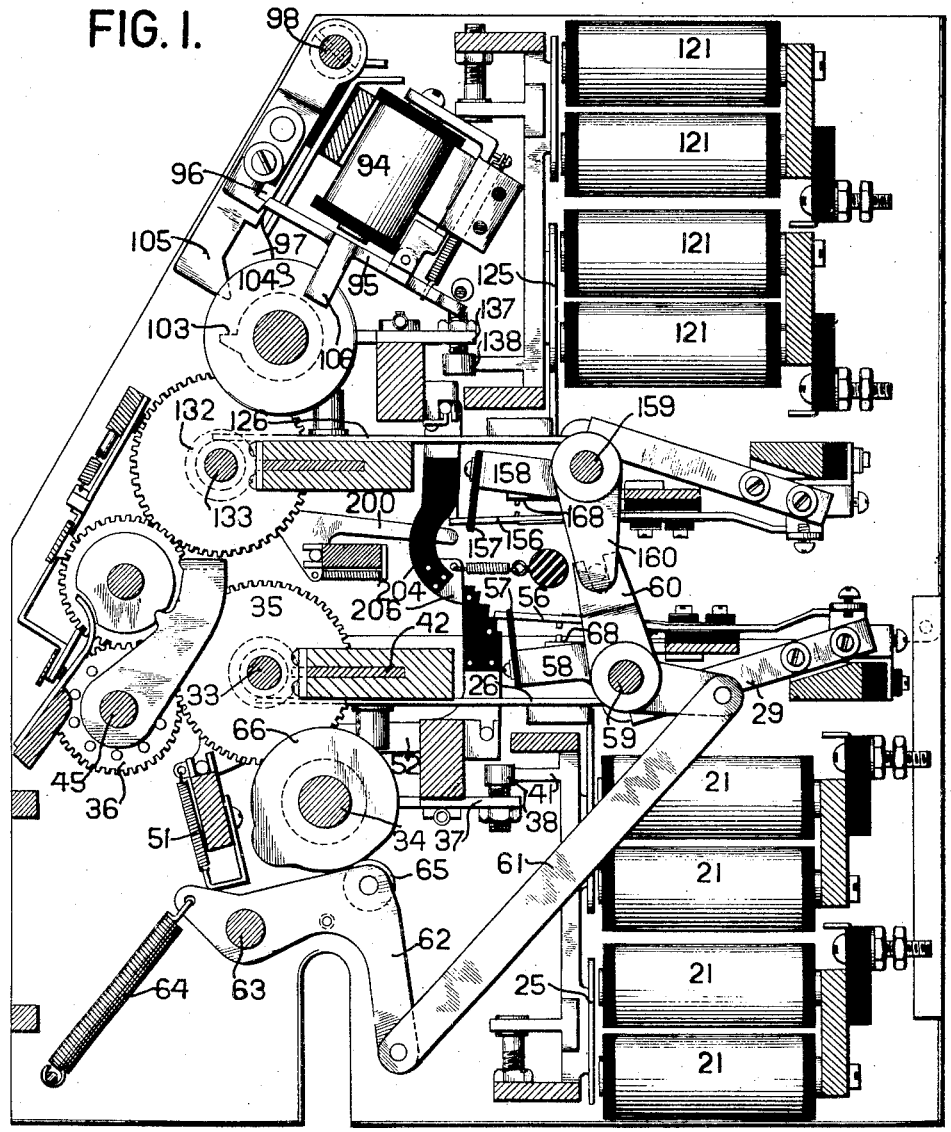
Figure 1 is a side elevation partly in section just inside the right hand casing of the accumulator section of the machine.
Figure 2:
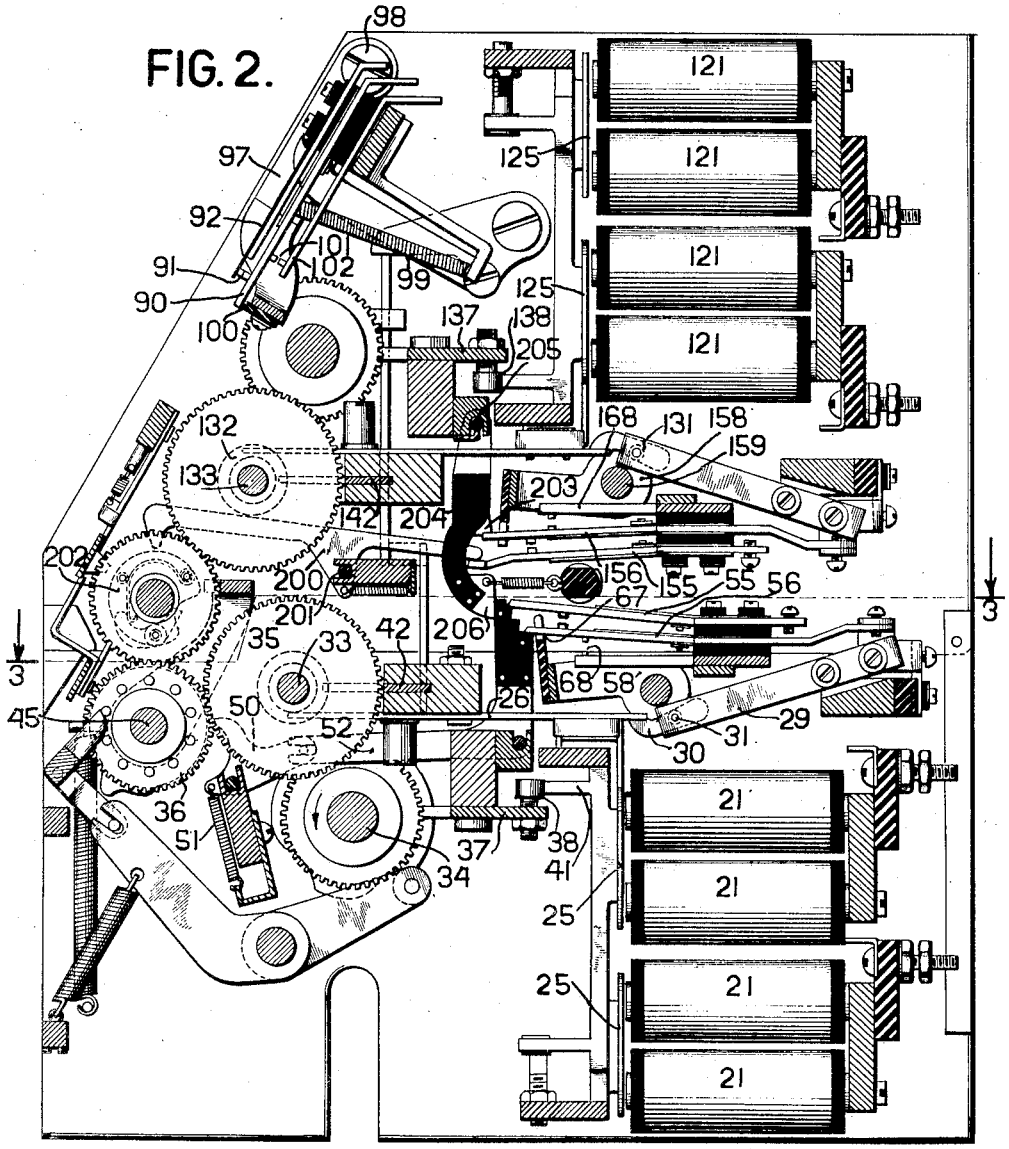
Fig. 2 is a side elevational view similar to Fig. 1 but taken between the counter sections.

During the adding operation previously described current flows to the lower counter magnets 21 by way of flat spring contacts 92 (Fig. 2). Upon every record card which bears an amount which is to be deducted instead of being added there is a distinguishing perforation. The amounts are perforated on the card in true number fashion and this additional perforation signifies that the amount perforated on the card is one of negative character. This particular distinguishing perforation establishes contact with a brush 93 (Fig. 13) when a card bearing a negative amount passes the sensing means. Such reading is made before any other perforations on this particular card are in position to affect other counter controlled magnets. When the special perforation is thus sensed a circuit is closed through contacts 92a to magnet 94 (see Fig. 13). The armature 95 of this magnet 94 is then attracted (Figs. 1 and 2) so that its outer end is opposite a notch 96, whereupon the bail 97, pivoted at 98, will be swung to the right by a spring 99 so that the insulated contact strip 100 carried by the bail will allow contact spring 90 to move to the right sufficiently to break contacts 91 and establish contacts 101 with contact springs 102, whereupon the current will flow through the upper set of magnets 121 instead of through the lower set 21.

By the foregoing means the current paths from the analyzing brushes are selectively diverted to either the lower magnets 21 or the upper magnets 121 depending upon whether the card is of positive or negative character. If the card is of negative character the upper or deducting mechanism will be in control of the register wheels.

It will be understood that there are a pair of contacts 91 and 101 corresponding to each register wheel. Bail 97 and armature 95 are restored to normal position at the end of each card cycle by pin 104 and cam 103 acting against bail arm 105 and armature arm 106 respectively. This action also restores contacts 92 and 92a. Contacts 92a will have opened up from their initially closed position upon lowering of bail 97 and upon restoration of the bail contacts 92a will be reclosed to their initial position.

The upper counter section of the machine also has the clutch shifting members 126 and the counter magnet contacts 131. Upper armatures 125 are restored by a restoring plate 137 with steps 138 which is reciprocated by a two-step cam on one face of the gear on the shaft which carries restoring cam 103. Restoration of members 126 is effected by a slide 142 operated by a two-step cam on one face of gear 144 on shaft 133. The upper mechanism is also provided with spring contacts 155 and 156 corresponding to lower contacts 55 and 56. Above the entire row of upper contacts is a bail 157 of insulating material carried by arms 158 pivoted at 159. This frame also has a depending arm 160 interlocking with an upstanding arm 60 so that the movement of the upper bail is controlled by the same cam 66 which actuates the lower bail. As the lower bail is raised the upper bail is lowered and vice versa. Bail 157 has notches in its lower edge and each contact 156 has a narrow end that fits into one of these notches while each contact spring 155 spans the notches. An upper contact 168 is provided corresponding to contact 68 of the lower set. Contact 155 is controlled entirely by the rear end of lever 200 pivoted at 201, the forward end of the lever resting on cam 202, there being one cam 202 fast to each upper register wheel. Contact 156 is controlled by bail 157 and by step 203 on arm 204, the upper end of which is pivoted at 205 and the lower end 206 kept in contact with the upper end of the upright portion of the plate 52 by a coil spring. The major portion of the arm 204 is made of insulating material as indicated.

Normally the contacts 155 and 156 occupy the positions shown in Fig. 2 with the front end of lever 200 resting on the concentric portion of cam 202 thereby keeping 155 out of contact with 156. Contact 156 is resting against the shoulder 203 on arm 204 and is thereby kept out of contact with 168. This is the position of the parts during the adding portion of the cycle.

Assuming that a negative card is in control, the upper register wheels are turning counter clockwise and adding on the upper wheels, thereby turning the lower wheels 20 clockwise and subtracting on such wheels. If the result of the entering operation is a positive amount or balance the operator of the machine reads the lower counter, the upper counter being obscured in the manner set forth in my co-pending application. When an amount is subtracted from the lower wheels it is evident that the operation, so far as passing from 10 to 9 is concerned, must be the reverse of the additive transfer operation already described, wherein the wheels pass from 9 to 10. Therefore whenever in any pair of wheels the wheel of next higher order stands at 0 it must be in receptive condition so that when the next lower wheel turns from 0 to 9 the higher order wheel will be clutched to the source of power and turn also. Thus we have in Fig. 6 the lower counter wheel reading 0 (the upper counter wheel reads 0 also but that is immaterial). Lever 200 is resting on the recessed portion of cam 202 thereby allowing contact 155 to contact with contact 156 (the latter being latched on 203) which is in the receptive position so that if current is sent through those contacts counter wheel 120 will be rotated one step forward and counter wheel 20 will be rotated one step backwards to 9. This operation will be subsequently explained in further detail.

Figure 5:
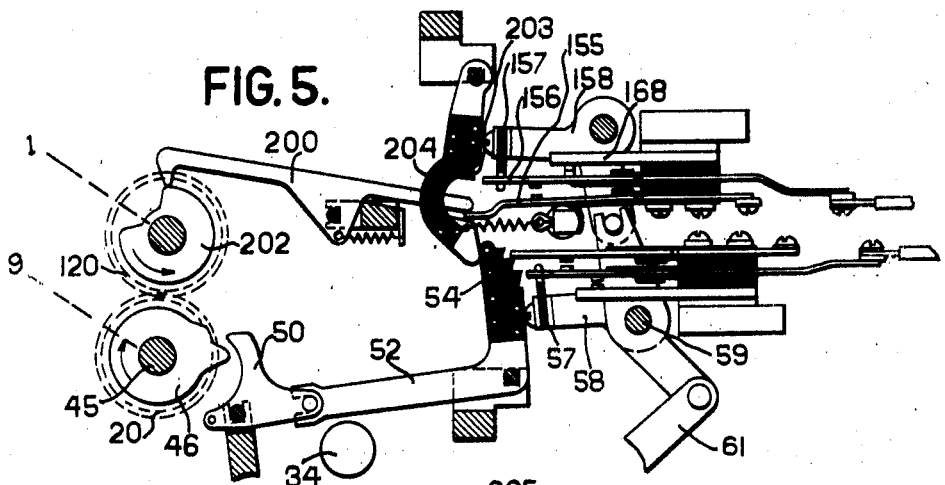

If now the lower wheel of the pair under consideration is turned backwards from 0 to 9 the raised portion 48 of cam 46 pushes angle lever 52 counterclockwise unlatching 156 and we have the condition shown in Fig. 5, assuming, of course, that the upper bail 157 has been retracted. It will thus be seen that arm 204 has been pushed to the left so that contact 156 has slipped off of shoulder 203 and is in contact with 168, while lever 200 is again on the high portion of cam 202 and therefore is holding contact 155 away from 156.

Figure 12:
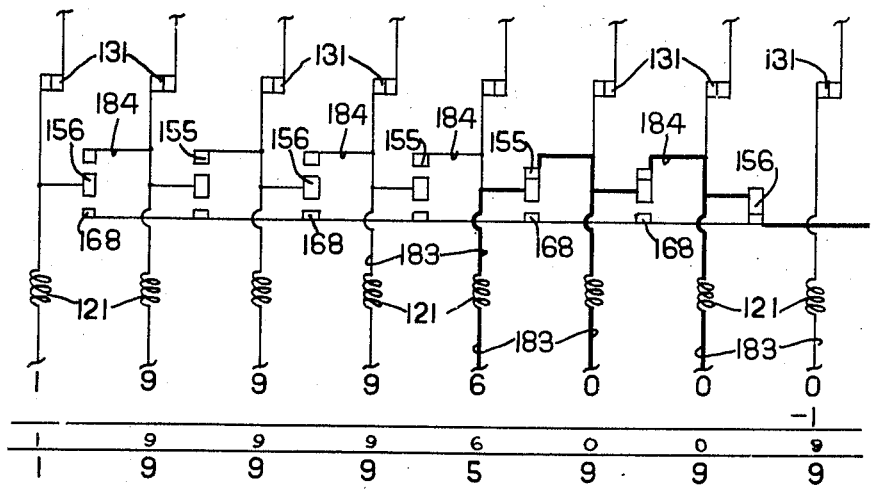
Fig. 12 is a diagram showing the position of contacts corresponding to a particular subtracting computation.

What happens under these conditions may best be shown by Fig. 12, in which is shown graphically the reverse of the additive transfer operation illustrated in Fig. 11. The numerals exposed are 19, 996, 000 and the amount to be subtracted is one unit. Counter magnet 121 at the right in Fig. 12 will be energized during the adding part of the cycle and will advance its register wheel 120 one space, thereby moving its corresponding lower wheel backwards one space to 9, and all other wheels which display zeros will have their contacts 155 and 156 in contact as already described and as shown in Fig. 6.

The movement of the units wheel from 0 to 9 has brought the upper contacts 156 and 168 which are now controlling its movement into position (Fig. 5) so that when bail 157 is retracted. 156 and 168 form a contact. At this point the subtracting part of the cycle is complete and the transfer controlling means is set up. Now contacts 81 are closed by cams 80 (Fig. 13) and current flow is established from contacts 156 and 168 controlled by the units wheel through and to the counter magnets of the tens wheel, by wire or other connection 183. Clutch lever 126 controlled by magnet 121 is unlatched, setting the clutch ready to be brought into operation to revolve the tens wheel one step. But the contacts 155 and 156 controlled by the tens wheel which at that instant exhibits 0 will be in position shown in Figs. 6 and 12 so that current will also pass by wire 184 to contacts 155—156 and thence by wire 183 of the hundreds wheel and through the latter's counter magnet and its controlling means is set to advance the hundreds wheel one step.

The contacts controlled by the hundreds wheel, which is also assumed to exhibit 0, control the means for advancing the thousands wheel one step in the same manner as described in the preceding paragraph.

In Fig. 12 the controlling circuits for the tens, hundreds and thousands wheel are shown in heavy lines.

The borrowing operation now takes place as the clutches engage and revolve simultaneously the tens, hundreds and thousands wheels one step and we have the correct result 19, 995, 999. Current flow is now broken by cam and contacts 85, all contacts are brought back to normal position by the bails 57 and 157 and the machine is ready to handle the next card.

The accounting machine thus has an accumulator with a transfer organization of such nature that for additive or positive entries, the transfer mechanism of the lower accumulator, which directly and primarily receives such positive entries, acts to effect additive transfers directly upon such lower accumulator.

Thus if amounts are entered from the cards directly into the lower accumulator (which amounts are of positive character) such lower accumulator will have its transfer mechanism coordinated to effect additive transfer. In such cases the transfer mechanism of the lower accumulator is in primary control and the action of transfer is wholly in the lower accumulator. Furthermore such transfer action takes place when the wheels of the lower accumulator pass from 9 to 0.

Upon the other hand if the lower accumulator is not receiving its entries directly but is receiving entries indirectly, through the upper accumulator (which is the case when negative entries are directly and primarily entered into the upper accumulator) such lower accumulator will be reversely actuated in a subtracting direction and it will have its transfer action modified to effect borrowing operations instead of additive transfer operations. In this case not only is the transfer action itself modified from additive carrying to borrowing, but the zone or cyclic time of action is changed to take place when the lower accumulator wheels pass from 0 to 9 instead of from 9 to 0.

The difference in transfer action upon the lower wheels for such subtracting operations is brought about in the following manner.

Controlling current from the records no longer goes to the transfer contacts 55, 56 and 68 but is diverted under the control of the records to the upper contacts 155, 156 and 168. The mechanical set up and control for these last mentioned contacts is still derived primarily and in the first instance from the lower wheels through parts 204, etc. This set up and contact control is, however, modified by the upper wheels through parts 200, etc. Control from the upper wheels occurs when the upper wheels pass from 0 to 1. These various contact controls effect proper current input to the differential magnets pertaining to the upper accumulator. The ultimate action is to impart the proper forward step or steps of advance to the upper wheels which action in turn imparts a corresponding reverse step or steps of movement to the lower wheels. This reverse or borrowing action upon the lower wheels occurs when such lower wheels pass from 0 to 9, and when the corelated upper wheels pass from 0 to 1.

It may be further reiterated that it is the passing of the upper wheels from 0 to 1 and this phase of the cycle of operation thereof taken in conjunction with the fact that the electric control system of these wheels is or are in a state or setting to direct current thereto that changes the phase of transfer action upon the lower wheels from 9 to 0 to a 0 to 9 condition. The converting of the transfer action for the lower wheels from an additive kind to a borrowing action is brought about by the transfer movement coming from the upper wheels.

Hence in the present machine there are lower transfer contacts 55—56 and 68 which are solely effective for additive transfers. There are other contacts 155—156 and 168 which are solely effective for negative transfers, but control of such contacts is in part derived from the lower wheels and modified by the action of the upper wheels. Such upper contacts exert their transfer control through the upper wheels to the lower wheels and the gearing together of the upper and lower wheels brings about a reverse or borrowing action upon such lower wheels.

What I claim is:

1. An accounting machine adapted for adding promiscuous positive and negative amounts and means for electrically controlling the same, said accounting machine comprising a set of accumulator elements in combination with transfer mechanism therebetween, a positively actuated member, contacts settable by the conjoint action of said accumulator elements and said positively actuated member to control said transfer mechanism for borrowing operations and means for causing a movement of the accumulator elements in a direction reverse to that employed for additive transfers whereby said contacts effect borrowing operations.

2. In a record control accounting apparatus for adding promiscuous positive and negative amounts derived from records, a set of accumulator elements in combination with transfer mechanism between said elements, said transfer mechanism having associated therewith electrical circuit controlling devices therefor, a positively actuated member, electric contacts settable by the conjoint action of said accumulator elements and said positively actuated member to control said transfer mechanism for borrowing operations and means for causing a movement of the accumulator elements in a direction reverse to that employed for additive transfers to thereby effect borrowing operations under control of the contacts.

3. Transfer mechanism comprising a dual set of transfer contacts, means for setting one set of contacts under the control of an accumulator, means for setting the other set of transfer contacts under the control of the first accumulator, and of another accumulator, and means for selectively diverting current to one or the other set of said contacts.

4. An accounting device comprising an accumulator, a set of auxiliary elements connected therewith to drive said accumulator or to be driven thereby, and borrowing means for said accumulator comprising devices conjointly controlled by said accumulator and by said auxiliary elements.

5. A transfer device for an accounting machine having one accumulator and another accumulator, the said transfer device comprising transfer controlling means adapted for initiating borrowing action, said borrowing action initiating means including a controlling means therefor which is controlled by one accumulator and a correlated control means therefor which is controlled by the other accumulator, said last two mentioned means cooperating to initiate a borrowing action at the proper zone and cyclic time for such action.

6. An accumulator system comprising two sets of accumulator elements of various orders, borrowing devices, and means for controlling the borrowing devices by one set of accumulator elements conjointly with the other set of accumulator elements.

7. An accumulator system comprising two sets of accumulator elements of various orders, borrowing devices for one set of accumulator elements comprising electric circuit controlling instrumentalities adapted to control borrowing operations, and means for controlling the borrowing devices conjointly by both sets of accumulator elements.

8. An accounting machine having a balance accumulator comprising two reversely operated accumulating sections, borrowing devices, means whereby said borrowing devices are controlled by both of said accumulating sections, means for modifying the zone of transfer action when the operation of the accumulator is changed from addition to subtraction, and means associated therewith for changing the action of the transfer from additive carrying to borrowing.

In testimony whereof I hereto affix my signature.

CLAIR D. LAKE.